Patented June 9, 1931

1,809,352

UNITED STATES PATENT OFFICE

IWAN OSTROMISLENSKY, OF NEW YORK, N. Y., ASSIGNOR TO THE PYRIDIUM CORPORATION, OF NEW YORK, N. Y., A CORPORATION OF NEW YORK

METHOD OF OBTAINING PHENYL-AZO-ALPHA-ALPHA-DIAMINO-PYRIDINE HYDROCHLORIDES

No Drawing. Original application filed September 23, 1927, Serial No. 221,629. Divided and this application filed May 31, 1928. Serial No. 282,052.

This invention is an improvement in methods of obtaining phenyl-azo-alpha-alpha-diamino-pyridine hydrochlorides, and the application is a division of Patent No. 1,680,111, granted August 7th, 1928.

Contrary to former beliefs, as for instance, that of Chichibabin enunciated in his book "Investigations in Pyridine Bases, 1918, Moscow", I have discovered that phenyl-azo-alpha-alpha-diamino-pyridine functions not only as a mono acid but likewise as a diacid base. Chemically pure phenyl-azo-alpha-alpha-diamino-pyridine dihydrochloride, which I succeeded in isolating, comes in the form of beautiful small prisms, dark red in color with a violet tinge, and which shimmer. Under the action even of cold water these compounds split off one molecule of hydrochloric acid and are transformed to phenyl-azo-alpha-alpha-diamino-pyridine monohydrochloride.

Probably it was precisely this hydrolysis which occurs in the dihydrochloride of this substance, that prevented Chichibabin from separating off analogous compounds. In washing the various compounds he had obtained with water, Chichibabin decomposed the di-salts and was thus unable to discover the existence of these salts. As concentrated and even 6% hydrochloric acid does not decompose dihydrochloride, this compound is easily produced by means of simple copulation of diazotized aniline with alpha-alpha-diamino-pyridine, of course provided the solutions of these substances be sufficiently concentrated and contain a sufficient amount of hydrochloric acid (not less than 6%).

My method of obtaining phenyl-azo-alpha-alpha-diamino-pyridine dihydrochloride considerably facilitates and simplifies the procedure of separating off the corresponding mono-hydrochloride. The product resulting from the copulation process is separated off directly in chemically pure condition and in the form of the above-mentioned characteristics prisms. As this substance displays high specific gravity, it precipitates readily in the container in which the reaction is conducted.

As distinguished from almost amorphous micro-crystalline mono-hydrochloride in powder form, which displays colloidal properties, it is easily and very rapidly filtered under pressure and is likewise very easily separated off from its mother liquor on a centrifuge; the residue which it has absorbed being easily removed by washing the substance in a weak, say 10%, solution of hydrochloric acid.

The phenyl-azo-alpha-alpha-diamino-pyridine monohydrochloride, may be obtained by pouring distilled water at room temperature over a dihydrochloride after it has been purified in the above described way. In this process the dihydrochloride immediately and quantitatively splits off one molecule of hydrochloric acid and is thus converted to chemically pure monohydrochloride. The latter substance is then separated off either by centrifuging or by filtration under pressure and washed in a small amount of ice water and dried to constant weight in a temperature of 40°—60° C. This new method of separating the mono-hydrochloride enables the elimination of recrystallizing the crude product from cold water, which entails considerable loss of the substance.

Example I 5191.28 gms. of freshly-distilled aniline are dissolved in a mixture of 14 litres of 37% hydrochloric acid and 24 litres of distilled water. About 10 kilograms of ice must then be added to the solution. The diazotization process is conducted by means of a solution of 3798 gms. of 90% sodium nitrite in 30 litres of water at 12° C., approximately. Of course the process is checked with iodostarch paper. When the diazotization is completed a solution of 6000 gms. of alpha-alpha-diamino-pyridine in 30 litres of 20% hydrochloric acid is added at one time into the product obtained.

I found by experience that the temperature of the freshly-prepared mixture should not be allowed to fall below 12° C. However, the most favorable temperature for this reaction is 16–18° C. Only at this relatively high temperature after diazotization does the mixture, when it has been allowed to stand for some 30–120 minutes, give a copious sediment of phenyl-azo-alpha-alpha-diamino-pyridine dihydrochloride, it precipitates rapidly to the bottom of the earthenware or porcelain container in which the reaction is conducted. This sediment is first separated off on a centrifuge whose surface must be covered with bakelite or any other acid-proof varnish and then washed in 10% hydrochloric acid and dried with air in a drying closet to constant weight at 30–45° C.

*Properties of the dihydrochloride*

As distinguished from the mono-hydrochloride, the substance which is obtained in the above described way, dissolves in cold aniline or pyridine. The solutions are from orange yellow to deep red in color, depending on the concentration. Phenyl-azo-alpha-alpha-diamino-pyridine-dihydrochloride is soluble in either aniline or pyridine contrary to phenyl-azo-alpha-alpha-diamino-pyridine-hydrochloride, which is only very slightly soluble. Most likely these solutions contain free phenyl-azo-alpha-alpha-diamino-pyridine-mono-hydrochloride and aniline and pyridine hydrochloride respectively. This substance dissolves easily in methyl and ethyl alcohol; in benzene and anhydrous acetone it is almost insoluble; when boiled with benzol (83° C.) it retains both its crystalline form and its glitter. In contradistinction to the mono-hydrochloride, the dihydrochloride dissolves very rapidly in luke-warm water. But even if cold water is poured over it, it immediately loses its glitter and crystalline form, and is converted to mono-hydrochloride. As distinguished from the aqueous solutions of the monohydrochloride the dihydrochloride solutions show a distinct acid reaction to congo paper.

Under the action of ammonia, dihydrochloride in powder form immediately changes its violet red color to a golden yellow and is transformed to free phenyl-azo-diamino-pyridines which melt at 139° C. after a triple recrystallization from boiling water.

Concentrated and even 6% hydrochloric acid does not produce any action on dihydrochloride, but it decomposes partially under the action of 4–5% hydrochloric acid, forming the mono-hydrochloride. A part of the original crystals remain unchanged in this reaction. 3% hydrochloric acid decomposes dihydrochloride to the mono-hydrochloride and free hydrochloric acid. The reaction takes place gradually but quantitatively. It takes three days to be completed. If heated in a test tube in an oil bath, chemically pure dihydrochloride at 180–210° C. splits off one molecule of hydrochloric acid and is converted to the mono-hydrochloride. In this reaction the original dihydrochloride crystals lose their glitter and become dull, although retaining their original shape. The resulting product yields perfectly neutral solutions with boiling water.

In this heating process (180–210° C.) dihydrochloride splits off its water of recrystallization which can be collected in a container and the amount of hydrochloric acid split off can be ascertained by means of silvernitrate. Under the same conditions phenyl-azo-alpha-diaminopyridine hydrochloride (180–210° C.) gives no water at all and splits off only a negligible quantity of hydrogen chloride in traces. If heated in a capillary tube dihydrochloride begins to split off hydrochloric acid perceptibly only at 180° C. The complete decomposition and coagulation temperatures for both compounds (i. e. mono-and-di-hydrochloride) in the process of heating in a capillary tube, lie around 220–224° C.

As has already been mentioned in the text of the present appplication the new compound which I separated off facilitates and reduces the cost of the process of obtaining mono-hydrochlorides, as already described by me, to quite a considerable extent A closer investigation of the phenyl-azo-alpha-alpha diaminopyridine obtained by conversion of the dihydrochloride into mono-hydrochloride as described in Example I shows, that whilst being but slightly toxic it displays very strong bactericidal properties. It dissolves quite easily in boiling water and the 1 to 2.5% aqueous supersaturated solutions made with it display considerable stability.

The behavior of aniline homologues and analogues, such as phenetidine, anisidine, toluidine, in copulation with alpha-alpha-diamino-pyridine is analogous with that of aniline itself. I have observed that under the same conditions these amines produce the dihydrochloride of the corresponding aryl-azo-alpha-alpha-diamino-pyridines. In turn these dihydrochlorides are converted by treatment with water to the corresponding mono-hydrochlorides.

The dihydrochloride of phenyl-azo-alpha-alpha-diamino-pyridine as described in this application, and the existence of which could not be foretold a priori, presents a certain interest for the following reasons:—

1. By means of the given dihydrochloride, the monohydrochloride of phenyl-azo-alpha-alpha-diamino-pyridine, in chemically pure condition, may be easily and quickly obtained from aniline and diamino-pyridine, as has already been pointed out.

2. In reaction with distilled water, the dihydrochloride of phenyl-azo-alpha-alpha-diamino-pyridine instantly splits off one molecule of hydrochloric acid and is thereby converted into monohydrochloride of phenyl-azo-alpha-alpha-diamino-pyridine. The phenyl-azo-alpha-alpha-diaminopyridine hydrochloride so produced is distinguished from phenyl-azo-alpha-alpha-diamino-pyridine hydrochloride obtained in the ordinary way, in that it dissolves relatively more easily in cold water. In this way it becomes possible to obtain very strong and probably supersaturated solutions of phenyl-azo-alpha-alpha-diaminopyridine hydrochloride, say 3% solutions, which are fairly stable, whereas, strong solutions of phenyl-azo-alpha-alpha-diaminopyridine hydrochloride (3%) obtained without the aid of dihydrochloride are distinguished by their excessive instability. They form very rapidly and easily a sediment of phenyl-azo-alpha-alpha-diaminopyridine hydrochloride.

3. In addition the dihydrochloride may be used in substantially the same manner as the monohydrochloride, that is, in the treatment of diseases caused by bacterial infection, the procedure with dihydrochloride being substantially the same as that with the monohydrochlorides. The statements in regard to structure are largely theoretical and are not intended as limitations.

The chemical reactions described, are illustrated in the accompanying structural formulas.

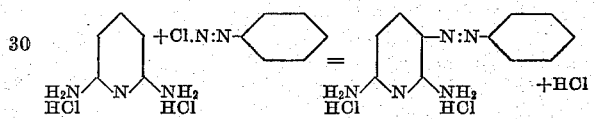

What is claimed as new is:—

The method of obtaining dihydrochloride of phenyl-azo-alpha-alpha-diamino-pyridine, which consists in copulation of phenyl-diazonium-chloride with diamino-pyridine in a medium containing not less than 8% (by weight) hydrochloric acid.

Signed at New York city, in the county of New York and State of New York, this 25th day of May, A. D. 1928.

IWAN OSTROMISLENSKY.